Nov. 24, 1964   H. P. DOETSCH ETAL   3,158,232
PNEUMATIC VIBRATION DAMPERS
Filed Dec. 5, 1963
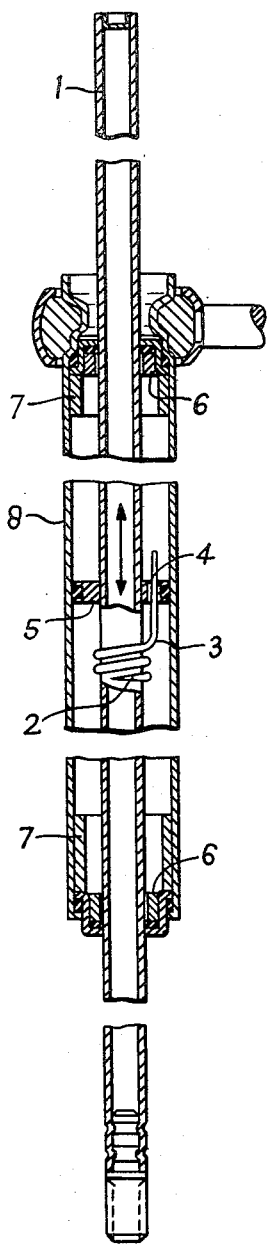

3,158,232
PNEUMATIC VIBRATION DAMPERS
Hans Peter Doetsch, 32 Altdrossenfeld, Uber Bayreuth, Germany, and Wilfried F. Roos, 47a Moselstrasse, Guls (Mosel), Germany
Filed Dec. 5, 1963, Ser. No. 328,413
3 Claims. (Cl. 188—94)

The invention relates to a pneumatic vibration damper with high internal pressure. In such dampers the degree of damping must be adjusted after the damping medium has been introduced under high pressure and the damping element has been sealed.

The invention is based upon the problem of providing a simple and sure possibility of adjustment.

This problem is solved according to the invention due to the fact that for the setting of the degree of damping there is arranged in force-locking fashion on the piston rod a helical spring, the one end of which is made slightly conical and passes, parallel with the piston rod, through a through-flow opening in the damping piston. For the axial displacement of this spring on the piston rod there are provided stops on the two ends of the pressure cylinder, so that the helical spring is shifted either in the damping-increasing or in the damping-reducing direction, according to which stop it is thrust against. In order to prevent undesired displacement of the spring on the piston rod, in the region of the stops there are provided elastic tubular pieces, the internal diameter of which is larger than the external diameter of the spring and the length of which is so selected that the spring cannot be shifted by the stops, even at extreme positions, without the elastic tubular pieces being deformed.

An example of embodiment of a vibration damper according to the invention is represented in the drawing. On the piston rod 1 there is secured in force-locking fashion the helical spring 2. Its end facing the damping piston 5 passes, parallel with the piston rod 1, through a through-flow opening 4 in the damping piston 5. At both ends of the cylinder 8 there are arranged stops 6, which serve for the displacement of the helical spring 2 on the piston rod 1. Furthermore on each end there are provided elastic tubular pieces 7, the length of which is so dimensioned that the spring 2 can be shifted on the piston rod 1 only when these tubular pieces 7 are deformed.

The degree of damping of the vibration damper is dependent upon the free cross-section of the through-flow opening 4, that is to say the degree of damping can be varied by displacement of the spring 2, since the through-flow opening 4 is filled more or less by the conical end 3 of the spring 2 in dependence upon the position of the spring. The adjustment of the spring 2 and its end 3 takes place simply due to the fact that the piston rod 1 is shifted in one direction or the other, according to whether the degree of damping is to be increased or reduced, until the spring 2 abuts on one of the stops 6 arranged on the rod end. In order to prevent unintended shifting of the spring 2, elastic tubular pieces 7 are provided in the region of the stops, the internal diameter of which pieces is greater than the external diameter of the spring 2, and the length of which is so selected that the spring 2, even in the case of extreme positions, can reach the stops 6 only if the tubular pieces 7 are elastically deformed.

Due to these measures a simple and sure possibility of the adjustment of the degree of damping of vibration dampers is provided.

We claim:

1. A pneumatic through-flow piston vibration damper with high internal pressure, wherein for the adjustment of the degree of damping a helical spring is arranged in force-locking fashion on the piston rod, the end of which spring is made slightly conical and passes, parallel with the piston rod, through a through-flow opening in the damping piston.

2. A pneumatic through-flow piston vibration damper according to claim 1, wherein for the displacement of the helical spring on the piston rod there are arranged stops on both ends of the cylinder.

3. A pneumatic through-flow piston vibration damper according to claim 1, wherein for the prevention of an unintended displacement of the helical spring elastic tubular pieces are arranged on both ends of the cylinder.

No references cited.